United States Patent
Qiu et al.

(10) Patent No.: US 11,635,380 B2
(45) Date of Patent: Apr. 25, 2023

(54) FLUOROMETER CALIBRATION DEVICE AND METHOD

(71) Applicant: Buckman Laboratories International, Inc., Memphis, TN (US)

(72) Inventors: Ke Qiu, Memphis, TN (US); Shunong Yang, Germantown, TN (US); Daniel Paik, Collierville, TN (US); Xin Gao, Cordova, TN (US); Dimitri Kouznetsov, Memphis, TN (US); Thomas McNeel, Memphis, TN (US); Michael Willer, Stillwater, MN (US)

( * ) Notice: Subject to any disclaimer, the term of this patent is extended or adjusted under 35 U.S.C. 154(b) by 100 days.

(21) Appl. No.: 17/374,454

(22) Filed: Jul. 13, 2021

(65) Prior Publication Data

US 2022/0011229 A1    Jan. 13, 2022

Related U.S. Application Data

(60) Provisional application No. 63/051,198, filed on Jul. 13, 2020.

(51) Int. Cl.
*G01N 21/64* (2006.01)

(52) U.S. Cl.
CPC .................................. *G01N 21/645* (2013.01)

(58) Field of Classification Search
CPC ........... G01N 21/645; G01N 2021/152; G01N 21/278
See application file for complete search history.

(56) References Cited

U.S. PATENT DOCUMENTS

| | | | | |
|---|---|---|---|---|
| 3,560,161 A * | 2/1971 | Webb | ..................... | G01N 35/00 436/98 |
| 3,901,656 A * | 8/1975 | Durkos | ................ | G01N 35/025 422/64 |
| 5,046,496 A * | 9/1991 | Betts | ................... | G01N 33/4925 600/352 |
| 5,284,570 A * | 2/1994 | Savage | .............. | A61B 5/14539 204/422 |
| 5,578,494 A * | 11/1996 | Clark | ..................... | B29C 45/00 220/283 |
| 5,611,994 A * | 3/1997 | Bailey | .................. | G01N 21/253 250/361 C |
| 5,851,488 A * | 12/1998 | Saul | ..................... | G01N 21/645 422/67 |
| 8,141,409 B2 * | 3/2012 | Crane | .................. | A61B 5/1459 73/1.02 |
| 9,423,389 B2 * | 8/2016 | Mazumdar | ......... | G01N 21/6428 |
| 2002/0154299 A1 * | 10/2002 | Robertson | ............ | G01N 21/645 356/246 |

(Continued)

*Primary Examiner* — David P Porta
*Assistant Examiner* — Djura Malevic

(57) ABSTRACT

A system and method for calibration of a fluorometer using a calibration cell comprising a sealed container housing one or more calibration solutions of known fluorescence. The inventive calibration device includes a sealed calibration cell housed in a storage chamber that may be permanently or temporarily affixed to the top of a fluorometer such that the calibration solution can be moved by manual or automated means directly from the storage chamber to the fluorometer cell for a calibration operation. All of the solution needed for any given calibration can be contained exclusively, in small quantity, inside the calibration cell.

26 Claims, 6 Drawing Sheets

(56) References Cited

U.S. PATENT DOCUMENTS

| | | | | |
|---|---|---|---|---|
| 2003/0032171 | A1* | 2/2003 | Gemmell | G01N 35/025 435/286.2 |
| 2005/0266398 | A1* | 12/2005 | Lea | G01N 33/5302 435/5 |
| 2005/0272972 | A1* | 12/2005 | Iddan | A61B 10/02 600/102 |
| 2007/0277596 | A1* | 12/2007 | Kim | G01N 30/14 73/61.48 |
| 2009/0093713 | A1* | 4/2009 | Hyde | A61B 34/30 606/34 |
| 2009/0093728 | A1* | 4/2009 | Hyde | A61B 5/061 606/41 |
| 2009/0186374 | A1* | 7/2009 | Okun | G01N 33/5008 435/29 |
| 2009/0277242 | A1* | 11/2009 | Crane | A61B 5/1459 73/1.02 |
| 2010/0129852 | A1* | 5/2010 | Putnam | G01N 33/52 435/29 |
| 2010/0291619 | A1* | 11/2010 | Robinson | G01N 35/0099 435/288.7 |
| 2010/0291669 | A1* | 11/2010 | Robinson | G01N 35/0099 901/14 |
| 2012/0015444 | A1* | 1/2012 | Mazumdar | C12Q 1/68 422/68.1 |
| 2014/0080119 | A1* | 3/2014 | Stein | G01N 33/56983 435/6.15 |
| 2015/0017641 | A1* | 1/2015 | Korpela | G01N 33/54366 422/69 |
| 2015/0104792 | A1* | 4/2015 | Mazumdar | G01N 33/1813 436/80 |
| 2016/0363532 | A1* | 12/2016 | Hagen | G01N 21/645 |
| 2019/0388889 | A1* | 12/2019 | Niemeyer | G01C 9/06 |
| 2022/0325268 | A1* | 10/2022 | Astier | C12Q 1/6883 |

* cited by examiner

FLUOROMETER CALIBRATION DEVICE AND METHOD

CROSS REFERENCE TO RELATED APPLICATIONS

This application derives priority from U.S. Provisional Patent Application No. 63/051,198, filed 13 Jul. 2020, the entirety of which is incorporated herein by reference.

BACKGROUND OF THE INVENTION

Field of the Invention

The invention relates primarily to systems and methods for improved, simplified and accurate calibration of a fluorometer. More specifically, the present invention is a self-contained calibration system, optimized for in-line fluorometers, comprising a manifold designed to be attached to an in-line fluorometer and a sealed capsule containing calibration fluids.

Description of the Background

Fluorometers are important measurement tools across a wide range of industries and applications. Fluorescence detection is a highly sensitive analytical technique for the detection of fluorescing material at low concentration. There are myriads of molecules which fluoresce and can therefore be tracked through various liquid systems whereby a measurement of the location and/or concentration of one or more fluorescent molecules in such system provides useful information to an operator, healthcare provider, or the like. Fluorescence is measured using a fluorometer.

There are several different types of fluorometers. Hand-held fluorometers typically require taking a sample from the process stream and transferring the sample to a measurement vessel (typically a cuvette or a vial). For a reliable and accurate measurement, it is necessary to clean the sample vessel and perform a calibration procedure prior to taking the measurement. Operation of a hand-held fluorometer requires the manual handling of samples and calibration solutions, which can be prone to spilling and contamination of the various solutions. Further, it is not possible to take a continuous measurement with a hand-held fluorometer. On the other hand, in-line fluorometers are suited for permanent or semi-permanent installation in an industrial processing line where continuous, real-time monitoring of fluorescing material (or a target compound tagged with a fluorescing material) is needed. There are two subsets of inline-sensors: submersible and through-cell sensors. Submersible sensors typically have a solid head with a lens that is designed to be installed in a pipe wall or otherwise submersed in the process flow. The face of the lens interfaces with the process fluid, and can detect fluorescence at one or more wavelengths in real time through the processing line.

Through-cell fluorometers generally have of a source of excitation radiant energy, an excitation wavelength selector, a sample cell to contain the target fluid or through-channel through which the target fluid travels, an emission wavelength selector, and a detector with signal processor.

Calibration of a fluorometer device is critical to obtaining accurate measurements. Calibration is necessary to account for various factors in the field, changing environmental factors, fouling of through-cell, interference by background fluorescence and measurement drift due to probe aging (detector and light source). For these reasons, calibration of a fluorometer is typically done prior to each discrete measurement, or at least on a regular, routine basis, depending on the application of the fluorometer in question.

A standard calibration process for a through-cell fluorometer involves at least the following general steps: (A) fill a syringe with a calibration solution; (B) inject the calibration solution into the flow cell of the fluorometer; (C) repeat the previous two steps several times to ensure the flow channel is flushed and filled completely; and (D) conduct the calibration using the fluorometer user interface. Typically, one or more "standardized" calibration solutions with a known quantity of fluorescent material are used to calibrate the fluorometer.

There are several drawbacks to this calibration method. For one, the process requires a significant amount of calibration solution. A through-cell fluorometer requires thorough flushing with the calibration solution prior to filling up the through-cell for calibration measurement. Typically, this process requires fluid in an amount 40-60 times larger than the volume of the through-cell itself. The same is true for a submersible fluorometer. Calibration of a submersible fluorometer requires submersion of the fluorometer head, and so a volume of water sufficient to cover the head is required. This requires a vessel (such as glassware) sufficiently large to hold a sufficient volume of calibration solution to allow immersion of the fluorometer head, plus storage space for both solution and glassware, plus any associated cleaning tools.

Moreover, contamination of the syringe(s), glassware, or calibration solution, air bubbles trapped in the fluorometer during injection, or insufficient flushing of the fluorometer will each independently lead to a failed calibration, requiring repetition of the entire process. In particular, improper storage of the calibration solution between calibrations may cause change in concentration due to evaporation, which will lead to an inaccurate calibration, and thus inaccurate measurements from the fluorometer. The present inventors have also noticed inconsistencies from batch to batch of standardized calibration solutions that are sold by various companies for use in fluorometer calibration operations, leading to further potential inaccuracies.

It would be advantageous to have a fluorometer calibration system which does not rely on injection of calibration solution into a flow channel, or immersion of the measurement head in a volume of calibration solution, so as to avoid the drawbacks of storing and handling bottles of calibration solution and the potential degradation of that solution over time. It would also be advantageous to have a system that uses a minimal amount of calibration solution, so as to cut down on the cost of same to the operator.

SUMMARY OF THE INVENTION

Accordingly, the present invention is a system and method for calibration of a fluorometer using a calibration cell comprising a sealed container housing one or more calibration solutions of known fluorescence. Although the inventive system and method are described with reference to a through-cell type fluorometer, it will be understood that the invention may also be applied or adapted for use in a submersible or other type of fluorometer.

The inventive calibration device includes a sealed calibration cell housed in a storage chamber that may be permanently or temporarily affixed to the top of a fluorometer such that the calibration capsule (or reference or cell) can be moved by manual or automated means directly from the storage chamber to the fluorometer cell for a calibration operation. All of the solution needed for any given calibration can be contained exclusively, in small quantity, inside the calibration cell.

The inventive device and method can further comprise means for completely automating the calibration process, and for automatically cleaning the fluorometer before and after calibration operations.

The foregoing objects, features and attendant benefits of this invention will, in part, be pointed out with particularity and will become more readily appreciated as the same become better understood by reference to the following detailed description of a preferred embodiment and certain modifications thereof when taken in conjunction with the accompanying drawings.

BRIEF DESCRIPTION OF THE DRAWINGS

In the drawings:

FIG. 1 is a composite (A), (B) and (C) diagram of a manifold comprising storage chamber 200 and plunger 300 according to a preferred embodiment of the present invention, wherein FIG. 1(A) is an interior cross section of the device in storage mode and FIG. 1(B) is an interior cross section of the device in calibration mode.

DETAILED DESCRIPTION OF THE PREFERRED EMBODIMENTS

The inventive system includes a manifold with a flow channel, the manifold being designed to be affixed to the base of a fluorometer, preferably a through-cell fluorometer. Alternatively, the inventive system may comprise a single-unit combination through-cell fluorometer with permanently adjoined manifold, sold as a single unit. Although a single unit will be primarily described herein, it will be understood that the inventive system can comprise one or more separable components designed to be add-on units to a fluorometer, and/or interchangeable with a standard cap or the like depending on the application. Further, although the inventive calibration device and method are described herein specifically for use with a through-cell fluorometer, it will be understood that other types of fluorometers can accommodate the inventive device and method without departing from the scope of the present disclosure.

In addition, the inventive system comprises a sealed calibration capsule containing one or more premeasured amounts of calibration solution, each with a known quantity of fluorescent material. The calibration capsule is sized to fit inside the manifold, as will be described below, and the manifold with calibration capsule will be connected to the fluorometer by a three-way valve to allow the calibration capsule to extend into the fluorometer cell during a calibration operation, and then retract into a storage position within the manifold for routine operation of the fluorometer, assisted by opening and closing of inlet and/or outlet points on the three-way valve or similar mechanism. The valve actuation can be either manual or automatic.

Figure 1:
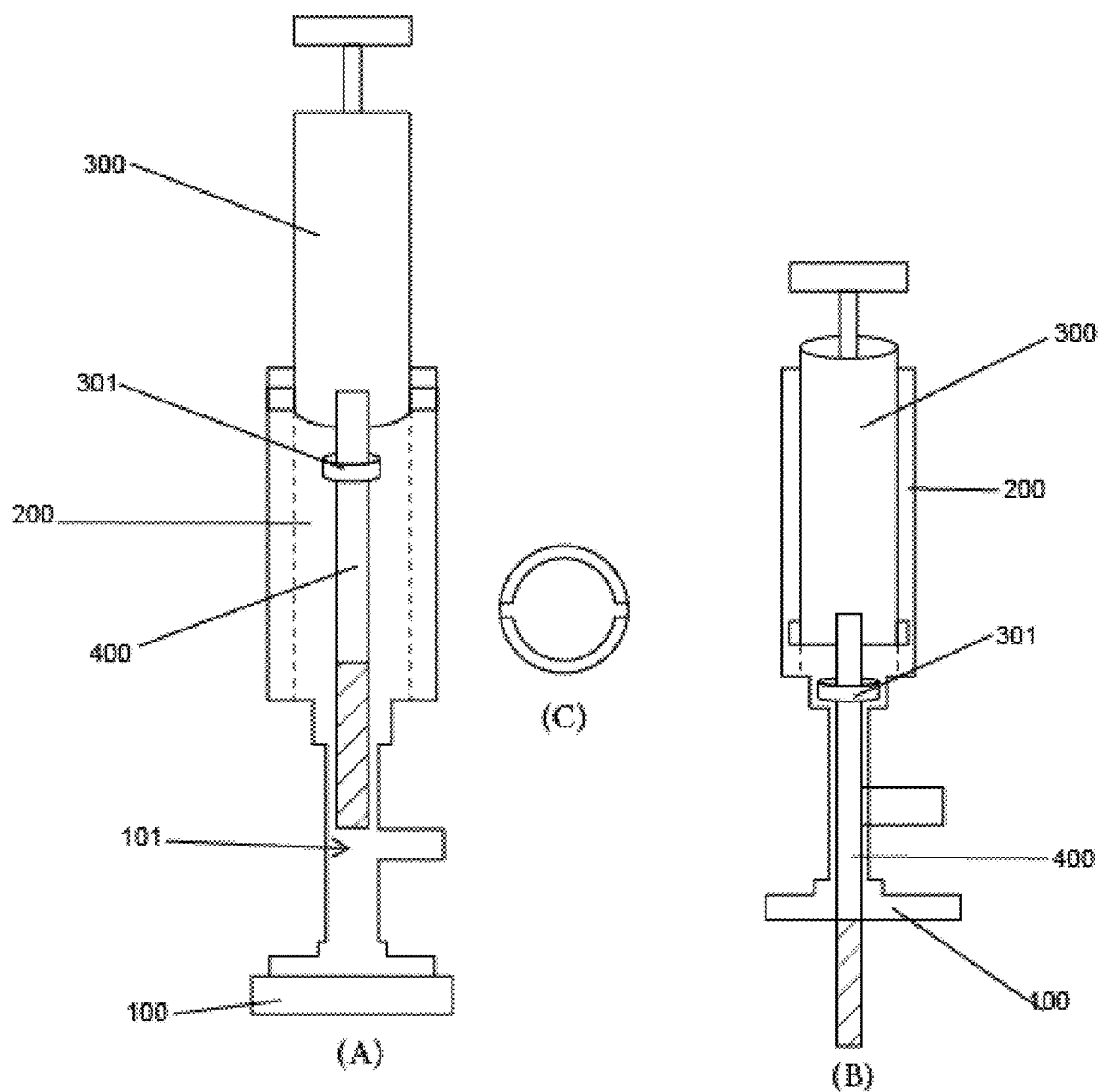

The configuration of the manifold and calibration cell according to certain embodiments of the invention is shown in FIG. 1. The flow channel of the fluorometer is represented by reference character 100. The manifold, comprised of storage chamber 200 and feeding plunger 300, is installed on top of fluorometer 100 and connected to fluorometer 100 by a tee or three-way valve, 101. Calibration cell 400 is housed within storage chamber 200 during normal fluorometer operation.

Figure 3:
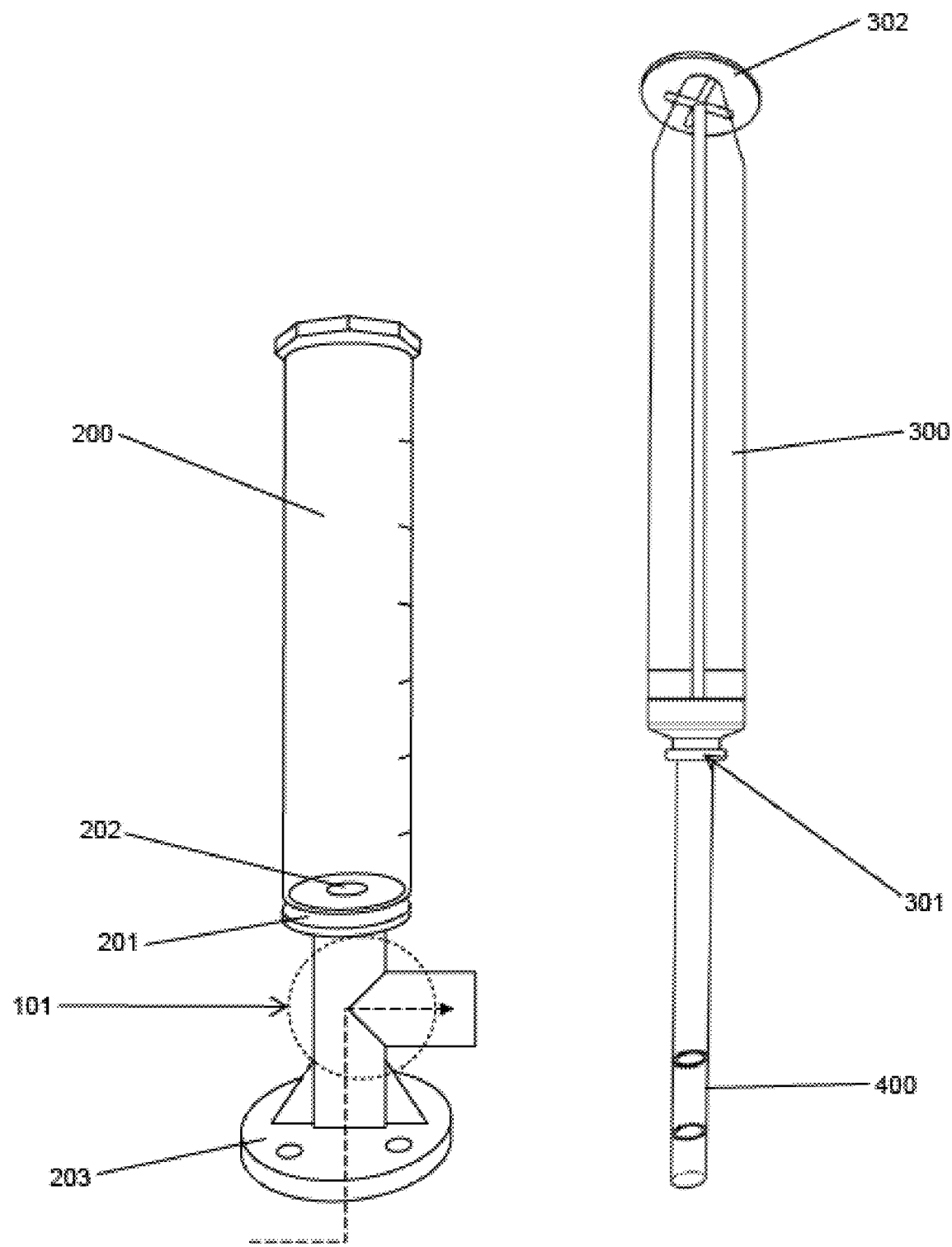
FIG. 3 is an exterior side view of the two separated components of the inventive manifold, storage chamber 200 and plunger 300/calibration cell 400.

As shown more specifically in FIG. 3, in preferred embodiments, the two component parts of the inventive manifold include a storage chamber 200 and a feeding plunger 300, shown separated in FIG. 3 for clarity. Storage chamber 200 preferably comprises a hollow, cylindrical body sized to accommodate feeding plunger 300. At the base of storage chamber 200 is a cap 201 which includes a central through-hole 202 having a diameter slightly larger than the diameter of calibration cell 400, to allow calibration cell 400 to pass therethrough without any notable friction as will be described. This cap serves two purposes: First, it prevents the flow cell from getting scratched by capsule cell. Second, it guides the capsule cell along the center axis to make sure light is irradiated perpendicularly when the cell is situated in the light interaction region. It can be made from plastics with smooth surface such as Teflon or Delrin. The base of storage chamber 200 is integrated with a three-way valve or tee 101 which controls flow of a liquid either into or out of a fluorometer (not shown in FIG. 3), wherein the dashed line in FIG. 3 indicates the fluid path during normal operation of the fluorometer. A flange 203 on the opposite side of three-way valve 101 connects the storage chamber (and feeding plunger 300 and calibration cell 400, as will be described) to the inlet or outlet of a fluorometer, either permanently or interchangeably with an end cap, further processing line, or other component part. In preferred embodiments, the fluorometer is a through-cell fluorometer.

Feeding plunger 300 is designed and sized to fit within storage chamber 200 much like the way that a syringe plunger would fit within a syringe barrel. Thus, feeding plunger 300 comprises a main body, which may be solid, have an "X"-shaped cross section as shown in FIG. 3, or have any other configuration known in the art so long as it can fit within and pass through the hollow, cylindrical interior of storage chamber 200. On a distal end of feeding plunger 300 is a flange 302 which has an exterior diameter slightly larger than the opening of storage chamber 200 and serves to stop the progression of feeding plunger 300 through storage chamber 200 as will be described. On the proximal end of feeding plunger 300 is a seal 301 which is sized to provide a water-tight fit against the central through-hole 202 of storage chamber 200 when feeding plunger 300 is fully depressed inside storage chamber 200. Importantly, the distance between flange 302 and seal 301 should be sufficient so that flange 302 does not stop the progression of feeding plunger 300 through storage chamber 200 before seal 301 can form a watertight seal against through-hole 202. In certain embodiments, seal 301 may be affixed to the proximate end of feeding plunger 300, while in alternative embodiments, seal 301 can be a ring-type seal encircling a top portion of calibration cell 400 (see, e.g., FIG. 1). In either case, the seal 301 serves the same primary purpose of forming a watertight seal against the base of storage chamber 200. In certain embodiments, seal 301 takes the form of a rubber grommet ring or a spacer which also performs the function of guiding the feeding plunger and calibration cell through the storage chamber, stopping the progression of calibration cell into the fluorometer at the appropriate point, ensuring that the calibration cell is vertically aligned during calibration.

Calibration cell 400 is located at the proximal end of feeding plunger 300. Calibration cell comprises a sealed cylindrical tube having one or more individually-sealed chambers as will be described. The diameter of calibration cell 400 is smaller than that of both feeding plunger 300 and through-hole 202. In this way, calibration cell 400 can pass through through-hole 202, out the bottom of storage chamber 200 and into the chamber of fluorometer 100 for calibration, as will be described, while feeding plunger 300 and/or seal 301 forms a water tight seal to prevent fluid from entering storage chamber 200.

Figure 4:
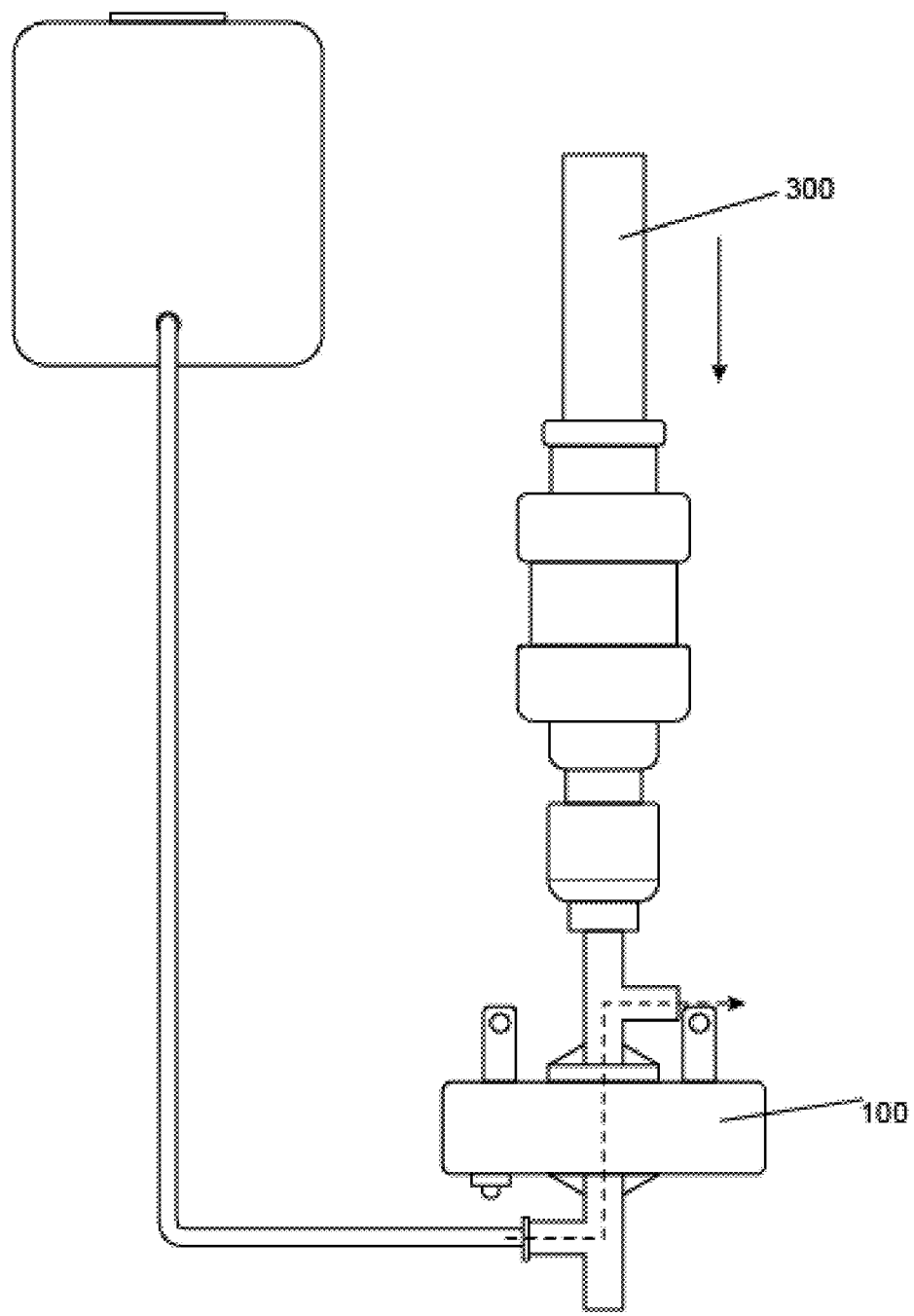
FIG. 4 is an exterior side view of the inventive device including the fluorometer, a water source and dashed lines to indicate the direction of water flow under normal use.
Figure 5:
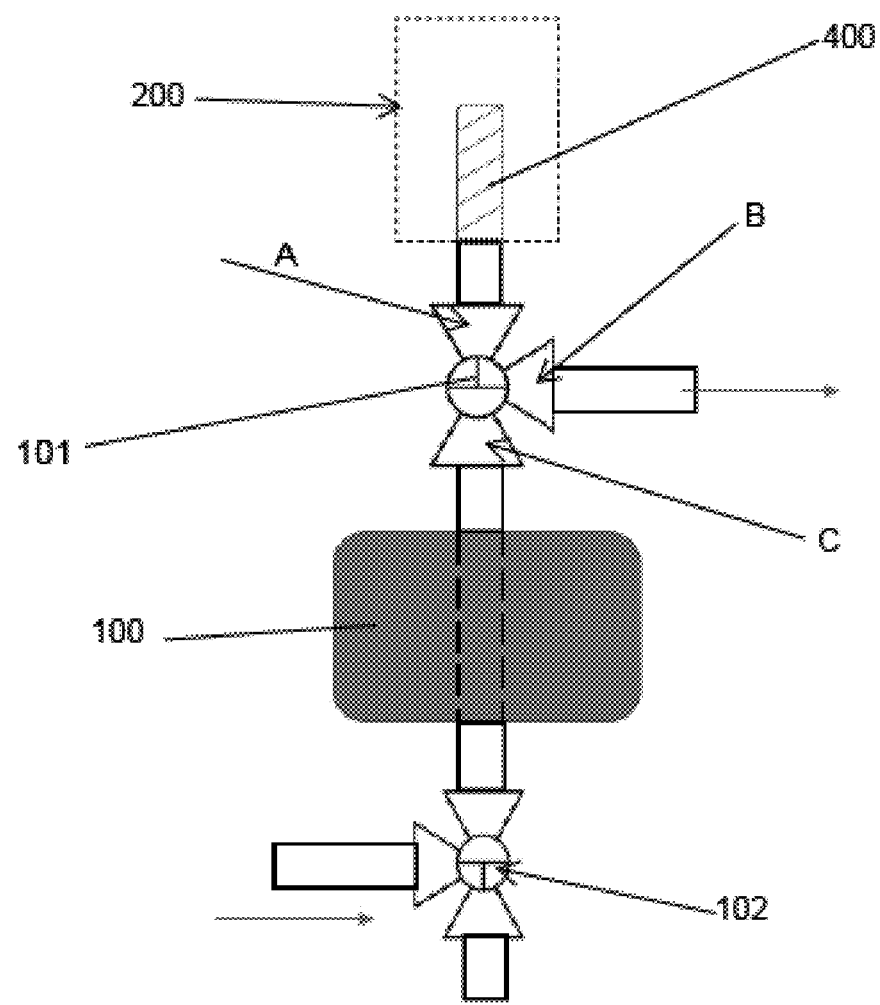
FIG. 5 is a schematic diagram of the inventive device showing optional valves.

From a mechanical standpoint, in preferred embodiments, the components operate as shown in FIG. 1. FIG. 1(A) illustrates the component parts assembled and positioned in a "storage position". FIG. 1(B) shows the assembled component parts in a "calibration position". With reference to FIG. 1(A), in a storage position, calibration cell 400 is retracted inside the hollow cylindrical body of storage chamber 200. Feeding plunger 300, which is attached to the distal end of calibration cell 400, rests at a top end of storage chamber 200 with flange 302 extending out of the top of storage chamber 200. In the case that a three-way valve 101 is used between storage chamber 200 and fluorometer 100, it is closed at position A so that fluid exiting the fluorometer 100 flows through valve positions C and B only, and out through an outlet as shown in FIGS. 4 and 5.

To move the inventive device into a calibration position, valve 101 is opened at position A. Flange 302 at the distal end of feeding plunger 300 may then be depressed, either manually or automatically (as will be described), until seal 301 meets the bottom of storage chamber 200. As feeding plunger 300 is depressed, as shown in FIG. 1(B), calibration cell 400 descends down through through-hole 202 into the cell of fluorometer 100. In some embodiments, feeding plunger 300 and/or storage chamber 200 have indentations or other mechanisms to stop the progression of calibration cell 400 into fluorometer 100 at certain predetermined intervals, corresponding to one or more independent chambers inside calibration cell 400. These indentations can also help to guide the plunger and calibration cell through the storage chamber, ensuring that it is vertically aligned through each phase and during calibration. In other embodiments, the feeding plunger 300 is mechanically controlled and the system includes mechanical means to depress the feeding plunger 300 different distances corresponding to the location of the one or more chambers inside calibration cell 400. In this way, the one or more chambers inside calibration cell 400 (to be described) can be individually positioned within the cell of fluorometer 400 to achieve different calibration processes.

Figure 2:
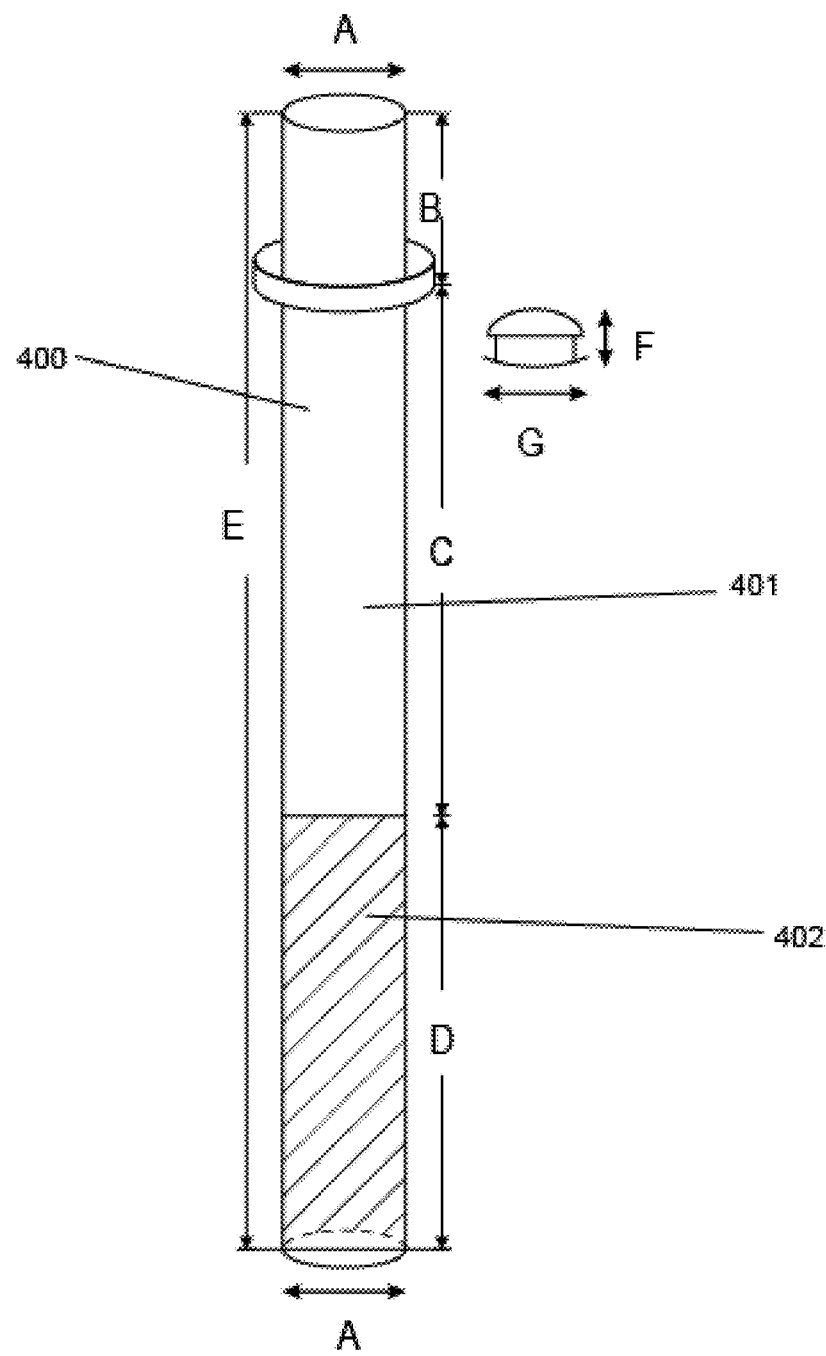
FIG. 2 is an isolated view of the calibration cell according to a preferred embodiment of the present invention.

FIG. 2 is an isolated view of calibration cell 400. FIG. 2 illustrates a calibration cell 400 comprising one chamber 402, although it will be understood that one, two, or multiple distinct chambers may be used depending on the needs of the particular application. Also as shown in FIG. 2, in preferred embodiments calibration cell 400 also comprises a blank rod 401, comprised of solid plastic or like material, which makes up the extra length needed for calibration cell 400 between calibration chamber 402 and the plunger 300, such that the calibration cell 400 is long enough to place calibration chamber 402 within the fluorometer when depressed. Blank 401 not only provides flexibility to the total sizing of calibration cell 400 for use in different applications, but can also help protect calibration chamber 402 from the direct forces applied to the end of calibration cell 400 by plunger 300 as it is manually or automatically moved through the device. In some embodiments, calibration cell 400 may comprise one or more calibration chambers 402 sandwiched between two blanks 401 on either end thereof. This configuration will assist with feeding the calibration chamber(s) 402 through the device and help avoid scratching of the flow channel surface, and a material appropriate for these purposes can be chosen for blank 401 from those known in the art.

Figure 6:
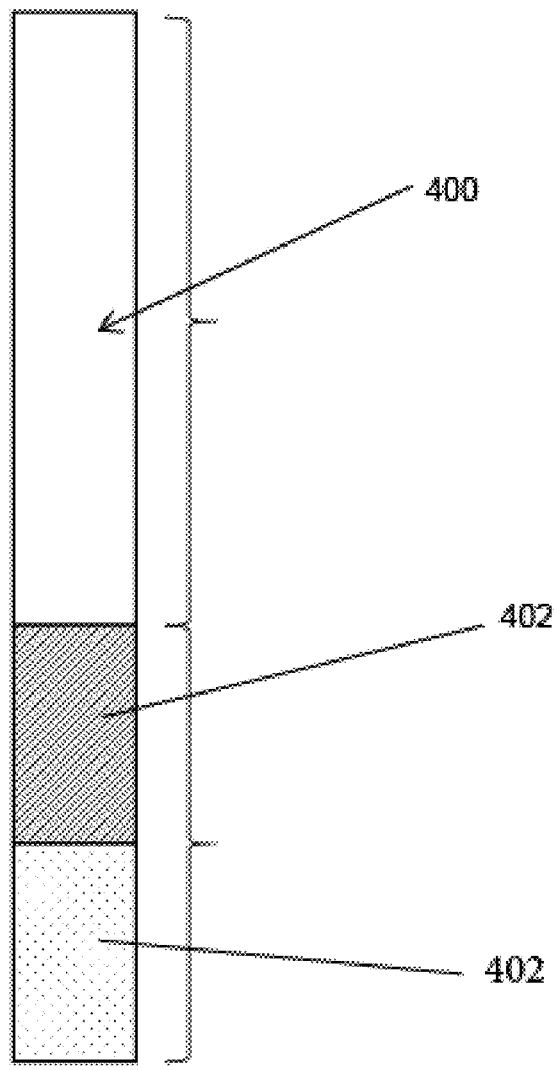
FIG. 6 is a schematic diagram of the inventive device showing an embodiment comprising two distinct calibration chambers 402.

FIG. 6 is another isolated view of calibration cell 400, but in this embodiment two separate calibration chambers 402 are shown. In some preferred embodiments, one of the two chambers 402 holds a zero calibration solution (such as deionized water) and the other chamber 402 holds a calibration solution with a known quantity of fluorescent material. In other embodiments, each chamber 402 includes fluorescent material in different quantities. In some preferred embodiments, where two or more calibration chambers are used, a corresponding number of stoppers 301 is also used to provide individual alignment of each compartment within the fluorometer's measurement chamber.

The length D of each calibration chamber 402 comprising the calibration cell should be close to the height of the fluorometer with which the inventive device will be used. The term "height" of the fluorometer is used herein to indicate the length of the light interaction region, which is typically a few millimeters. The length D of the each calibration chamber 402 should be slightly longer than the height of the fluorometer, to allow for margin of error in alignment position of the calibration chamber 402 within the fluorometer, so that it can be more easily ensured that the entire fluorometer has calibration material positioned within it during a calibration operation. Where multiple calibration chambers 402 are used, each such chamber 402 will have a length approximating D, the height of the fluorometer. The diameter of the calibration chamber 402 should be as close as the size of the flow channel inside the fluorometer 100 as possible. In some preferred embodiments, calibration cell 400 has a single sealed calibration chamber 402, preferably containing a calibration mixture in a gel form (two different dyes+agarose gel).

As noted, calibration cell 400 preferably comprises a permanently sealed capsule 402 having one or more independently sealed chambers, each chamber housing one or more reference substances with unique emission spectra in response to being irradiated with an excitation light source in a predetermined range of interest. One particularly advantageous aspect of the sealed calibration chamber 402 is that reference substances housed therein have a greater shelf life than fluorophores dissolved in solutions, such as calibration standards used in prior art fluorometer calibration methods. The reference substances used in the present invention are more stable because they are housed in a sealed chamber, and can thus lead to higher consistency and uniformity between calibrations. The reference substances are preferably multi-functional calibration media comprising fluorophores suspended in gel, but could be any form of reference material known in the art for use in performing calibration processes.

The inventors have discovered that a fully sealed calibration chamber of the type described herein can store calibration solution (preferably in gel format) without degradation of the calibration solution for at least twelve (12) weeks, or longer. In preferred embodiments, calibration solution is stored with minimal exposure to light, and so storage chamber 200, in which the calibration cell 400 is stored when not being used for a calibration operation, can be made of a light-blocking material, such as PVC or an equivalent material.

In preferred embodiments, calibration chamber 402 is made from a UV transparent material to allow excitation and fluorescent waves to pass through the cell walls without distortion. Preferred materials for calibration chamber 402 include fused glass, Polymethyl methacrylate (PMMA), or the like.

In preferred embodiments, calibration chamber 402 comprises a single chamber comprising a known calibration solution, while the blank calibration is performed with the calibration cell 400 retracted away from the fluorometer cell. In other preferred embodiments, calibration chamber 402 comprises two independently sealed chambers, one having a known calibration standard and one having a "blank" of deionized water or the like to be used to determine the zero set-point of the fluorometer. In other preferred embodiments, the calibration chamber 402 comprises two or more independently sealed chambers, each containing a different calibration standard. The calibration chamber 402 can also include reference standards for turbidity measurements as described below.

Materials that could be used for calibration solutions inside calibration chamber(s) 402 include:
(A) Liquid/solid calibration standards, such as surrogate compounds (including but not limited to quantum dots, organic fluorescent materials, noble-metal nanoclusters, and/or carbon dots).
(B) Fluorescent-doped polymer blocks, which could be incorporated as an interior, "filler" material inside calibration chambers 402; alternatively, calibration chamber 402 itself could be formed entirely from fluorescent-doped polymer blocks, and either be solid or hollow, filled with air. PMMA fluorescence reference blocks are an example of this type of technology, such as PMMA fluorescence blocks manufactured by Starna Cells (each of the reference blocks has different fluorophores with different excitation and emission curves which can be machined into the inventive device's calibration cell 400).
(C) Fluorescent materials-incorporated into UV-Vis transmittance gel (e.g. Agarose, Polyacrylamide).
(D) Combination of photodiodes (PDs) and light-emitting diodes (LEDs) of appropriate wavelength to correspond to the specific fluorometer detectors, along with the necessary driver circuitry, arranged in such a way that during calibration the PDs can detect the source light emitted from the fluorometer and induce a proportional intensity of light to be emitted from the LEDs and directed to the fluorometer detectors.

Potential candidates for a liquid/solid calibration standard could include: Carbon Quantum Dots—Blue luminescent, Perovskite quantum dots, Quinine Sulfate, Coumarin derivative fluorophores (AMCA, CMAC, etc.), Fluorescent Brightener 162, 9,10-Diphenylanthracene, DAPI (4',6-diamidino-2-phenylindole), and/or Rare Earth Elements (such as Thulium).

In certain embodiments, the material inside calibration chamber(s) 402 incorporates a turbidity calibration solution, either incorporated into the calibration standard or housed in a separately sealed chamber within calibration cell 400. In exemplary embodiments, polyacrylamide gel media (a clear gel) is used as a calibration standard, and a turbidity standard can be incorporated into the gel to allow turbidity calibration. In other exemplary embodiments, agarose gel can be used as a calibration standard. This material shows intrinsic haziness, and therefore can be used as a dual-purpose calibration and turbidity standard.

In other exemplary embodiments, the material inside calibration chamber(s) 402 incorporates a buffer solution and/or a polymer with counter-ions. For example, where PTSA dye (which is strongly anionic) is used as a fluorescent material, the use of cationic polymers (counter-ion to PTSA) or the use of buffer will help to fix the position of the PTSA molecules within the gel so that they can't diffuse, thereby increasing the stability of the calibration gel. Use of a cationic polymer or buffer in this instance will prevent the phenomenon whereby PTSA is likely to diffuse inside an Agarose gel (nonionic) material in the presence of a driving force (ionic, thermal, electrical, etc.). This phenomenon could lead to inhomogeneous PTSA distribution across the gel, and cause inconsistent results.

In alternate embodiments, a cationic polyacrylamide gel is used as the material inside calibration chamber(s) 402, to which a PTSA molecule is then attached to form a calibration standard.

As noted above, the length D of each calibration chamber is designed to be slightly longer than the length of the light interaction region of the fluorometer for which it will be used. In some embodiments, each calibration chamber 402 is preferably smaller than 10 mm in diameter, and the length of the total calibration cell 400 is between 1 and 5 inches, more preferably between 2 and 3 inches, such as 2.7" long. In other preferred embodiments, the length of the entire calibration cell 400 is roughly the same as the length of plunger 300.

Also in preferred embodiments, the calibration cell 400 can comprise a cleaning apparatus on a distal end thereof, e.g. the end that first passes through the fluorometer as the calibration cell 400 is moving downwards into the calibration position; in certain embodiments, the device is designed to provide a spiral motion is coupled to the downward translation. In one embodiment, the cleaning apparatus can be in the form of a plastic rod with a cleaning head, akin to a swab, whereby the cleaning head is flexible but has an initial diameter similar to that of the fluorometer chamber. In other embodiments, the cleaning apparatus can be in the form of a tube brush, such as where heavy deposits are expected. In this way, pushing the calibration cell 400 down through the fluorometer will cause the cleaning apparatus to pass through the fluorometer first and clean it immediately prior to the calibration process. In certain embodiments, the cleaning apparatus includes both a cleaning and drying tool. In yet other embodiments, the dual cleaning and drying apparatus can comprise a tube brush head, followed by a cotton mop for drying.

A method of calibrating a fluorometer using the inventive calibration manifold is also disclosed. First, the fluorometer inlet valve 102 is closed and a three-way valve 101 (if used) is opened at position A. In some embodiments, the flow channel is then rinsed with water, cleaned and dried. This may be done manually or, as described herein, by operation of the cleaning attachment as it passes through the flow channel ahead of the calibration cell 400, in the following step. One or more calibration protocols may then be performed according to the specific calibration protocol(s) of the fluorometer with which the inventive device is being used. For each calibration, a different portion of the calibration cell 400 can be positioned within the fluorometer's flow channel, or the calibration cell 400 can be retracted into the storage chamber 200, e.g., for a blank calibration. Thus, if the operator (or system automation) desires to perform a blank calibration, the calibration cell 400 can be positioned with the "blank" chamber in the fluorometer channel, or the calibration cell 400 can be retracted back into the storage chamber 200 to allow the blank calibration to proceed with only air (or water) in the fluorometer's chamber. For fluorometers that have two calibration modes, e.g. "blank" and "solution", calibration cell 400 can be positioned with two separate chambers in the fluorometer channel, or with one chamber holding a calibration solution in the calibration chamber for the "solution" calibration operation, and retracted for the "blank" calibration operation as described. As can be seen, it's possible to perform n+1 separate calibration operations for the fluorometer using the calibration cell 400, with n being the number of separately sealed chambers 402 in calibration cell 400, plus an additional calibration operation with air or water as a blank. Following the completion of all calibration operations desired by the operator or system automation, the calibration cell 400 will be fully retracted into storage chamber 200 and the appropriate valves will be opened and/or closed to allow normal fluorometer operations to resume.

For a standard fluorometer calibration operation, at least two calibrations take place, one with a blank and one with a solution having a known fluorescence. The (at least) two data points thus obtained can be used to calculate the slope coefficient and zero shift for the fluorometer. Various additional calibration operations can be used, using solutions having different amounts of a known fluorescent material, as needed to support accurate operation of the fluorometer. This may be accomplished using a calibration cell 400 having multiple, separately sealed chambers 402 having different calibration standards in each, or having different concentrations of the same calibration standard, as described herein, or alternatively by a device having a simple means for replacing a calibration cell 400 with another cell having one or more different chambers with different calibration standards, as needed and/or to replace the solutions over time, to prevent degradation. This may comprise a screw top or other means to remove and securely replace the calibration cell 400 to which the pushing plunger 300 is attached. In alternative embodiments, this could mean that calibration cell 400 is detachable from plunger 300, e.g. by unscrewing.

As will be understood, the above-described method for calibrating the fluorometer can also comprise performing a turbidity calibration, using one of the solutions mentioned above or known in the art to allow performance of turbidity measurements, which solution is contained within one or more chambers 402 of the calibration cell 400.

Movement of the pushing plunger 300 (and thus of calibration cell 400) can be accomplished manually, by the operator, such as by using a thumb to depress the distal end of pushing plunger 300 through storage chamber 200 as is done with a syringe. Markings can be contained on the outside of pushing plunger 300 and/or storage chamber 200 to indicate to the operator the proper position of plunger 300 to place the desired portion of calibration cell 400 within the fluorometer cell, or to retract calibration cell 400 back into storage chamber 200. In the embodiment where a multi-compartment chamber is used, each compartment position is marked on the plunger 300 (such as a notch) for situating a desired chamber in the light interaction region.

Alternatively, movement of the plunger 300 and calibration cell 400 can be accomplished by automated means. The mechanism(s) of automation could include mechanical, magnets (e.g., a solenoid valve), compressed air, and/or pressurized water, including incoming flow from valve 102 to reset the position of calibration cell 400 into storage chamber 200.

The calibration process can be more completely automated by wired or wireless connection of the inventive manifold and automation device(s) to a processor running software programmed to run one or more calibration operations on a specific schedule, or as other system criteria indicate that a calibration operation is due. For example, such a system could also utilize inputs from other portions of a processing line, to detect fouling or other unusual conditions of the measured fluid or environment, and determine based on predetermined criteria or machine learning that a calibration operation is needed. Such a system could also be designed to monitor multiple fluorometers and direct calibration operations sequentially or in batches, and/or use inputs from other fluorometers to measure the performance of a particular fluorometer in question and schedule a calibration operation based on this data.

A completely automated system could, in addition to determining the calibration operation(s) needed and the timing of same, send control signals to the automated means of moving the plunger 300, as well as to valves associated with the movement of fluid around the fluorometer (e.g., valves 101 and 102) to completely automate the calibration operation(s).

In addition to the features above, the inventive calibration device can incorporate various additional features in additional embodiments to enhance the utility of the device. Exemplary features include a rubber diaphragm positioned immediately above valve 101 (see FIG. 5) and below storage chamber 200, which diaphragm has a flexible opening slightly smaller than the diameter of the calibration cell 400, such that calibration cell 400 is cleaned by squeegee action each time it passes through this diaphragm down into the fluorometer cell. Another optional feature is a "gliding" attachment to the exterior of calibration cell 400 to assist the cell 400 in gliding in a consistent position down into the fluorometer without scratching any surfaces.

Calibration cell 400 can also be used as a secondary standard, to check the fluorometer for stability and/or drift during normal operation of the fluorometer without needing to close valves, such as the main-stream valves, to monitor the system. For example, for a fluorometer that is placed in the side-stream of a skid, such that water can still run through the main stream, one or more calibration operations can be performed by inserting the inventive device into the flow channel of the fluorometer whereby process water can still flow through the main stream. By comparing a current reading from the fluorometer against a "known" value of the calibration standard in the calibration cell, the operator and/or system can determine when the fluorometer needs re-calibration.

As can be seen, benefits of the inventive solution over prior art methods and devices include (1) simplicity and ease of the calibration procedure, (2) the use of much less consumable (calibration solution, thereby resulting in a cost savings), (3) longevity of calibration solution, since it is housed inside a sealed container, (4) saved storage space, in that it is no longer required to have a large amount of calibration solution on hand, and/or vessels to contain a depth of calibration solution sufficient for the probe to be immersed in, (5) ability of the operator to avoid direct contact with a calibration solution (prevents further contamination), (6) consistency and uniformity of calibration within and across platforms, including the ability to clean the fluorometer immediately prior to the calibration operation as described, and (7) possibility for complete automation of the calibration protocol as described above.

While the device disclosed herein is particularly useful with through-cell fluorometers predominantly used in industrial operations (power, steel, petrochemical, etc.), it is within the scope of the invention disclosed herein to adapt the device to other types of fluorometers, and use in other fields.

This application is therefore intended to cover any variations, uses, or adaptations of the invention using its general principles. Further, this application is intended to cover such departures from the present disclosure as come within known or customary practice in the art to which this invention pertains.

We claim:

1. A fluorometer calibration device, comprising:
    a calibration cell comprising a sealed chamber incorporating one or more separately housed calibration standards, said calibration cell having a distal end and a proximal end;
    a storage chamber sized to house said calibration cell, said storage chamber having a proximal end corresponding to said proximal end of said calibration cell; and
    a plunger affixed to said distal end of said calibration cell, said plunger being sized to pass through said storage chamber;
    wherein said proximal end of said storage chamber is affixed to a flow channel in fluid connection with a fluorometer.

2. The fluorometer calibration device of claim 1, wherein said calibration cell comprises a cylindrical tube made from a material selected from the group comprising fused glass and polymethyl methacrylate.

3. The fluorometer calibration device of claim 1, wherein each of said one or more separately housed calibration standards each have a known quantity of fluorescent material.

4. The fluorometer calibration device of claim 1,
    wherein said calibration cell comprises a cylindrical tube having a diameter; and
    wherein said proximal end of said storage chamber comprises a through-hole having a diameter slightly larger than the diameter of said calibration cell.

5. The fluorometer calibration device of claim 4, further comprising a ring-shaped seal around an exterior of said calibration cell near a distal end thereof, said ring-shaped seal being sized to provide a water tight seal against said through-hole.

6. The fluorometer calibration device of claim 5, wherein said ring-shaped seal is sized and shaped to guide said calibration cell through said storage chamber and ensuring that said calibration cell is vertically aligned within said fluorometer.

7. The fluorometer calibration device of claim 1, wherein said proximal end of said storage chamber is in fluid connection with said fluorometer via a three-way tee.

8. The fluorometer calibration device of claim 1, wherein said proximal end of said storage chamber is in fluid connection with said fluorometer via a three-way valve.

9. The fluorometer calibration device of claim 8, wherein said three-way valve can be alternatively opened or closed to allow either fluid to pass through said fluorometer and out through an outlet, or to allow for said calibration stick to pass through said three-way valve and into said fluorometer.

10. The fluorometer calibration device of claim 1, wherein said plunger is movable by automated means.

11. The fluorometer calibration device of claim 10, wherein said automated means comprise a means selected from the group comprising electromagnetic actuation, pneumatic control (e.g. compressed air, or pressurized water), and helical actuation.

12. The fluorometer calibration device of claim 1, wherein said one or more separately housed calibration standards comprises two separately housed calibration standards each having a different quantity of fluorescent material (or no fluorescent material, "blank"), and which are independently sealed within said calibration cell.

13. The fluorometer calibration device of claim 1, further comprising a cleaning head on a proximal end of said calibration cell.

14. The fluorometer calibration device of claim 1, further comprising a diaphragm positioned between said proximal end of said storage chamber is and said fluorometer, and sized to clean said calibration cell by squeegee action as said calibration cell passes through.

15. The fluorometer calibration device of claim 1, wherein said one or more separately housed calibration standards are selected from a group comprising a buffer solution with counter-ions, a polymer solution with counter-ions, fluorophores suspended in gel, or one or more known liquid/solid calibration standards.

16. The fluorometer calibration device of claim 1, wherein said one or more separately housed calibration standards comprises a combination of photodiodes (PDs) and light-emitting diodes (LEDs) of appropriate wavelength to correspond to detectors specific to said fluorometer, wherein said LEDs are arranged such that during calibration the PDs can detect the source light emitted from the fluorometer and induce a proportional intensity of light to be emitted from the LEDs and directed to said detectors.

17. The fluorometer calibration device of claim 1, wherein said one or more separately housed calibration standards incorporate one or more reference standards for turbidity measurements.

18. A system for calibrating a fluorometer, comprising:
    a calibration cell comprising a sealed chamber incorporating one or more separately housed calibration standards, said calibration cell having a distal end and a proximal end;
    a storage chamber sized to house said calibration cell, said storage chamber having a proximal end corresponding to said proximal end of said calibration cell;
    a plunger affixed to said distal end of said calibration cell, said plunger being sized to pass through said storage chamber;
    wherein said proximal end of said storage chamber is affixed to a flow channel in fluid connection with a fluorometer; and
    wherein said fluid connection is controlled by an automated valve;
    an automated means of moving said plunger through said storage chamber; and
    a processor in operative connection with said automated valve and said automated means of moving said plunger, said processor running software programmed to control movement of said automated valve and said plunger to run one or more calibration operations.

19. A method of calibrating a fluorometer using the device of claim 1, the method comprising:
    positioning a first portion of said calibration cell within a light interaction region of said fluorometer;

performing a calibration operation corresponding to a known quantity of fluorescent material within said first portion of said calibration cell; and retracting said calibration cell into said storage chamber.

20. The method of claim 19, further comprising, prior to said retracting step:

positioning a second portion of said calibration cell within said light interaction region of said fluorometer; and performing a calibration operation corresponding to a known quantity of fluorescent material within said second portion of said calibration cell;

wherein said first and second portions of said calibration cell each correspond to a different separately sealed chamber of said calibration cell, each such chamber holding a calibration standard with a unique quantity of fluorescent material.

21. The method of claim 19, further comprising:

performing a "blank" calibration operation while said calibration cell is fully retracted into said storage chamber.

22. The method of claim 19, further comprising, prior to said positioning step:

opening a valve between said storage chamber and said fluorometer to enable said fluid connection with said fluorometer.

23. The method of claim 22, wherein said method is automated.

24. The method of claim 19, wherein said method is automated.

25. The method of claim 24, wherein said step of positioning a first portion of said calibration cell within a light interaction region of said fluorometer utilizes electromagnetic actuation.

26. The method of claim 24, wherein said step of positioning a first portion of said calibration cell within a light interaction region of said fluorometer utilizes helical actuation.

* * * * *